Oct. 30, 1923.
W. A. BROWN
1,472,384
PROCESS OF SEPARATING HYDROCARBONS FROM WATER
Filed Feb. 24, 1919
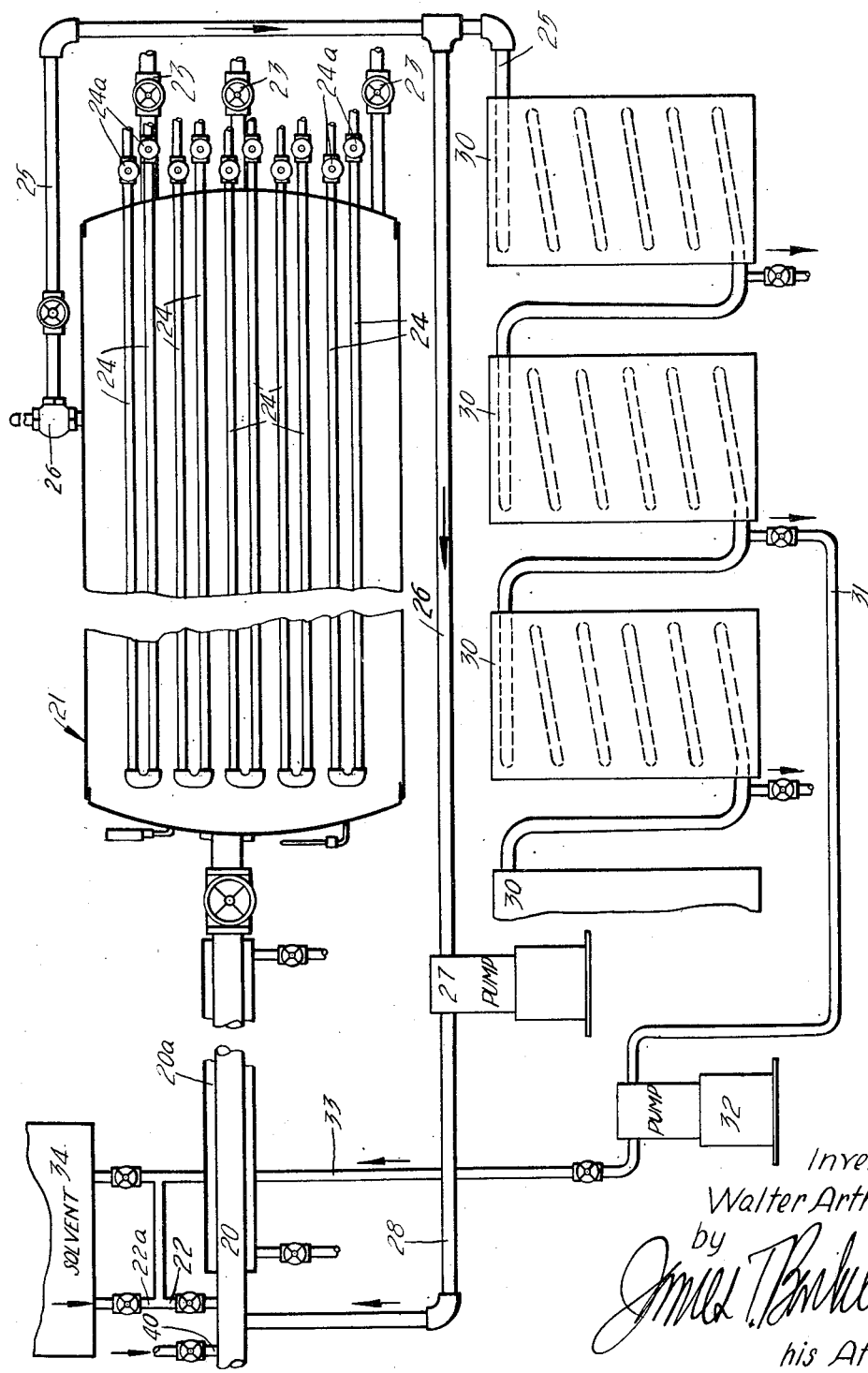
Inventor
Walter Arthur Brown
by
his Attorney.

Patented Oct. 30, 1923.

1,472,384

UNITED STATES PATENT OFFICE.

WALTER ARTHUR BROWN, OF LOS ANGELES, CALIFORNIA.

PROCESS OF SEPARATING HYDROCARBONS FROM WATER.

Application filed February 24, 1919. Serial No. 278,728.

*To all whom it may concern:*

Be it known that I, WALTER ARTHUR BROWN, a citizen of the United States, residing at Los Angeles, in the county of Los Angeles, State of California, have invented new and useful Improvements in Processes of Separating Hydrocarbons from Water, of which the following is a specification.

This invention relates to processes for separating hydrocarbons, such as petroleum and other oils, from water mixtures, particularly such mixtures as are known as emulsions; or from all hardly separable mixtures of water and oil of any kind whether of crude petroleum or other natures in which the mixtures are caused by natural forces or whether of artificial oils, etc. in which the mixtures are caused in processes of manufacture, use or other circumstances.

I have described and claimed in my Patent 1,309,794 granted July 15, 1919, a process for separating hydrocarbons from a water mixture by the use of heat and pressure. The present invention has to do with a process, which, in its fundamental and simplest form is distinct, in its specific features, from the process set forth in said patent, and yet I find that in some circumstances a combination of the present process with that process described in said patent, produces effective results. And this statement is also true as regards the present process and the process which I particularly set forth (involving the use of a mechanical precipitant) in an application co-pending herewith, Serial No. 278,729, filed Feb. 24th, 1919.

The present invention has particularly to do with the separation of the oil and water by the use of what I may term a solvent. I have found that certain substances which will form a solution with water and will also form a solution with petroleum oils, will, if an emulsion mixture of water and oil be treated therewith, cause an immediate loosening and a freeing of the water and oil and will allow the water to freely settle out of the oil by gravitational action or will allow it to be removed by any similar simple action, such as by centrifugal action. I attribute the action of these substances to the fact that, by their solution forming capacity with both the water and the oil, they break down the strength of the separating films of water and oil and, by weakening or more or less destroying these films, allow the water particles to collect, or allow the oil particles to collect, or both, as the case may be. The coalescence of either or both of the oil or water particles of course then forms the mixture into large bodies of oil and water and the water will then readily separate out of the oil.

I have found that such liquids as alcohol, both methyl and ethyl and also acetone will effect the desired results. These liquids are miscible in all proportions with water and also will, to a certain extent, form a solution with petroleum oils. I find that the admixture of a comparatively small amount —say one barrel of alcohol or acetone to one hundred barrels of emulsion—will immediately break down the emulsion and allow the water to settle, especially when the emulsion is somewhat warmed in order to increase its fluidity and the fluidity of the oil, and also when the mixture is somewhat agitated to obtain a ready, even distribution of the solvent.

When the separation takes place, most of the solvent goes with the water, the amount going into either depending somewhat on the percentage of the water, a very small proportion going with the oil. By subsequently distilling the solvent off the water, it may be recovered and used again; and even that portion of the solvent which goes with the oil may be recovered by fractional distillation. If the oil were not to be distilled, it might not be worth while to distill merely for the purpose of recovering the small percentage of solvent which goes with the oil, but in a great many cases distillation of the oil for the purpose of obtaining tops is carried on in the immediate vicinity of, or in conjunction with, the dehydration operations. And, in fact, in some operations of dehydration this topping is carried on during the process of dehydration. In such cases the solvent can be easily recovered without much expense. Also, in some of the adaptations of my process, the heating of the emulsion itself may be carried to such an extent as to vaporize off the solvent after it has performed its duty, and the vaporized solvent may then be condensed and separated more or less completely from the lighter petroleum constituents and sent back into the process. I will explain such variations of the present process in the following detailed description.

The simplest form of my process needs no extended description. The emulsion may be put into any suitable container and the solvent in proper proportion put into the emulsion. This, without any further operation, will cause the coalescence and settling of the water. However, it is desirable to somewhat warm the emulsion to increase its fluidity and it may be desirable also to use some means to introduce the solvent quickly and uniformly to different parts of the emulsion. For instance, the emulsion may be stirred or otherwise agitated during the introduction of the solvent or immediately thereafter. It is preferable, however, that there be no great disturbance during the actual final settling of the water, although some disturbance during the action of the solvent in causing breaking down of the films and coalescence of the water particles is sometimes advantageous. After the water and oil have separated the solvent may be recovered from the water by distillation and may then of course be used again. The small part of the solvent which goes with the oil may be recovered as hereinbefore stated. Now such a process as this may be carried on in such an apparatus as I illustrate in the accompanying drawings in which—

The single figure is a diagram showing a suitable apparatus in which various forms of process as I hereinafter describe may be carried on.

The emulsion may be pumped under suitable pressure through a pipe 20 into a treating or settling tank 21. Pipe 20 may preferably be of comparatively large diameter and may also be of some length between the pipe 22, where the solvent is introduced, and the tank 21; so that the emulsion may flow slowly through the pipe for a considerable distance before reaching tank 21. A suitable quantity of solvent may be, if desired, continuously introduced at 22$^a$ from a supply of the liquid solvent into the continuous flow of emulsion through the pipe 20; and by the time the emulsion has reached the tank the solvent will be thoroughly intermingled with it and the emulsion will be broken down. Tank 21 may be of such size and of suitable length so that the mixed emulsion and solvent may flow slowly and quietly therethrough, the water settling to the bottom and the oil rising to the top in this tank. Water may be continuously withdrawn from the far end of the tank at the bottom and oil from the upper parts of the tank. For this purpose, valve controlled discharge outlets are provided at 23. The water and solvent may be taken from the lower outlet to any suitable distillation apparatus and the solvent distilled off and used again; and so likewise may the small amount of solvent be recovered from the oil.

Before the liquids reach the tank they may be warmed in pipe 20, by steam jacket 20$^a$, to any suitable temperature. While the liquids are in the tank they may be somewhat heated by the use of steam coils 24. These may be provided as separate superimposed coils having individual valve controls at 24$^a$ so that any one or more or all of the steam coils may be used for heating any part or all of the whole mass of liquid. Any part or the whole of the mass of liquid may be warmed sufficiently to provide fluidity to accelerate the settling.

If the process is carried on as a batch process the distillation and the recovery of solvent may be carried on in the tank 21 itself. For instance, the tank may be filled with an emulsion and the solvent may be introduced in the manner hereinbefore stated, or in any suitable manner. The liquids may be somewhat warmed, and the circulation due to the warming may be used to distribute the solvent through the mass. The water will then settle and the oil may be decanted from the tank. The water and the solvent in the tank may then be heated up to such a temperature as to distill the solvent over through the vapor discharge line 25. An adjustable pressure valve 26 may control the discharge line so as to keep any suitable pressure on the tank. The vapor of the solvent may either be passed through pipe 26 and pumped by a pump 27 through pipe 28 directly back to the pipe 20 to mix with the emulsion standing in that pipe ready for the next charging of tank 21, or this vapor may pass on through the pipe 25 into suitable condensers 20. And then the condensate may pass through pipe 31 and be pumped by pump 32 through pipe line 33 and through pipe 22 directly into the emulsion pipe 20, or it may be pumped into the solvent supply tank 34.

Or (either in the continuous or batch method) before the oil is withdrawn from tank 21 and either before or during or after the settling of the water the whole mass of liquid may be heated to such a temperature as to drive off the solvent in vapor form through vapor line 25 into the condensers. Usually there will of course be vapors of the lighter hydrocarbons also driven off and then all of these vapors may be subjected to fractional condensation in the condenser 30, the oil condensate being withdrawn and the solvent condensate being withdrawn from the proper point in the condenser system and then put back either in the tank 34 or directly into the supply pipe 20. It is of no particular consequence that in such an operation some light hydrocarbon condensates may also be put back into pipe 20 along with the solvent condensate. And this method of procedure may be carried on continuously; the mixed emulsion and the solvent passing continuously through the pipe 20 and being continuously intermingled by the agitation due to flow through that pipe, and passing continuously into tank 21 where they are continuously heated to such a temperature that the solvent is slowly vaporized while the water settles to the bottom and the oil rises to the top. The solvent vapors together with whatever oil vapors may be generated at the temperature used pass through vapor line 25 into the condenser system and the condensate of the solvent may then be put back directly into pipe 20. In this mode of operation the separated oil and water may be withdrawn continuously at the outlet 23. The keeping of an excess amount of the lighter hydrocarbons in the system, due to the condensation of some of those constituents along with the solvent, is an assistance to the operation of the process as it tends, among other things, to increase the fluidity of the oil, and is an assistance in causing the ready settling of the water.

In my Patent 1,309,794 of July 15, 1919, I have set forth a method of separating water and oil from an emulsion mixture by settling the water under application of pressure and temperature and also at times by the use of a mechanical precipitant. The method of settling by use of temperature and pressure amounts to substantially this: That the emulsion is subjected to a temperature somewhat around or somewhat above the normal boiling point of water and at the same time is subjected to a pressure sufficient to keep the water from freely vaporizing—that is to keep the liquid from foaming over by reason of vaporization of the water. After a short subjection to such condition the water will then settle. In order to accelerate the settling of the water I have preferred to use during the period of settling a relative increase of pressure in comparison with the temperature of the liquid during the period of settling. This may be accomplished either by lowering the temperature without lowering the pressure or raising the pressure without raising the temperature or the combination of both procedures.

Now I have found that use of the solvent as herein described not only in itself is an effective method of separating the water and oil but also is an effective assistance to the pressure and temperature method. And I may practice a method which is in fact a combination of both methods; and at the same time I provide for the recovery of the solvent. The mixed solvent and emulsion may be passed into tank 21 as herein provided either as a batch or may be passed continuously through the tank as stated. While in the tank the liquid may be subjected to a temperature somewhat around or somewhat above the normal boiling point of water and the pressure may be then held by valve 26 just sufficient to repress the vaporization of water but so as to allow the vaporization of the lighter hydrocarbon constituents and to relieve the pressure which would be generated by that vaporization. At the same time the solvent itself is vaporized and passes into the vapor line and into the condenser system where the solvent is recovered as hereinbefore described and the hydrocarbon vapors are condensed.

The water may then be allowed to settle without further procedure or an additional pressure may be placed upon the liquid in the tank without increasing the temperature of the body of liquids, repressing more or sometimes all of the vaporization. But I usually prefer to attain this excess pressure by heating the upper parts of the body of liquids by using the upper steam coil or coils. I have explained in application Ser. No. 278,727, filed Feb. 24th, 1919, and co-pending herewith, my preferred process of topping the oils at the same time that the water is settled out; and in general I do this by heating the oil, which then has risen or is rising to the upper part of the liquid, to a higher temperature and thus generating the additional pressure to accelerate the settling of the water and at the same time topping the oil. The additional pressure thus generated may be about 5-7 pounds; but the temperature is such as to cause more or less free vaporization at that pressure. The vapors of the tops will of course be passed into the condensing system and there condensed, and along with these vapors any residual solvent vapors remaining in the oil will also be passed into the condensing system and condensed and thus recovered.

Furthermore, I have explained in my application Ser. No. 278,729, filed Feb. 24, 1919, and co-pending herewith, further in detail my process for separating oils and water from an emulsion mixture by the use of a mechanical precipitant. I have explained therein how the use of the proper kind of mechanical precipitant may, when used alone and without any other agency, or merely with a warming of the emulsion, cause the separation and settling of the water. Such a precedure may be used however in conjunction either with my temperature and pressure method or in conjunction with this solvent method. The precipitant itself is preferably a non-soluble mechanical precipitant and is further preferably a precipitant of the character of the fine, earthly particles which are carried by clay mud or, most preferably, fine earthy particles of such earth as fuller's earth. Dry fuller's earth I find to be effective although I may use wet, fluid, clay mud or the like; but such mud I find to be more effective after it has been used once or several times and after the earthy particles have become impregnated with oil. The character of my preferred precipitant will be seen to be rather soft and smooth rather than hard and sharp; and having to a certain extent some absorbent qualities. In using such a mechanical precipitant I find it preferable to introduce it into the system along with the emulsion so that the flow of the emulsion into the tank or through the pipe 20 will cause thorough distribution of the precipitant. Therefore I may introduce the precipitant at 40 into pipe 20 and the precipitant will thus be thoroughly intermingled with the emulsion by the time it reaches the tank 21. The use of this precipitant may be practiced either with the solvent method alone or with the combination of the solvent and heat and pressure method, as will be readily understood. The mechanical precipitant always settles to the bottom along with the water and usually washes out of the tank with the water and can be settled from the water and used again. In the case of fuller's earth it is preferable to dry the precipitant before reuse.

In the forms of the process where the liquids are heated for the purpose or with results of vaporizing the solvent this heating may take place before or during or after the actual separation of the water by settling but it will take place after the freeing of the water from its emulsion bond with the oil, the freeing taking place as soon as the solvent has been thoroughly distributed and usually, in the form of apparatus herein shown, taking place in the pipe 20 or taking place in the tank 21 before the emulsion is heated up to a temperature (if it is heated to such a temperature) that will vaporize the solvent.

Having described a preferred form of my invention, I claim:

1. In a process for separating hydrocarbons and water from a mixture thereof, admixing alcohol with said mixture, to thereby free the water from the hydrocarbons, then heating the whole admixture under a pressure sufficient to prevent water vaporization, but allowing vaporization of the alcohol and of the lighter hydrocarbon constituents.

2. The herein described continuous process for separating hydrocarbons and water from a mixture thereof, embodying the maintenance of a body of said mixture, continuously admixing alcohol therewith, continuously heating the whole admixture to a temperature and under a pressure sufficient to prevent water vaporization, but allowing vaporization of the alcohol and of the lighter hydrocarbon constituents, removing the vaporized substance, and continuously readmixing the alcohol with the continuously maintained body of mixture.

3. The herein described continuous process for separating hydrocarbons and water from a mixture thereof, embodying the maintenance of a body of said mixture, continuously admixing alcohol therewith, continuously heating the whole admixture to a temperature and under a pressure sufficient to prevent water vaporization, but allowing vaporization of the alcohol and the lighter hydrocarbon constituents, separating the alcohol and hydrocarbon vapors, and continuously readmixing with the body of mixture the separated alcohol and the hydrocarbon vapors that go along with it.

4. In a process for separating hydrocarbons and water from a mixture thereof, admixing alcohol with said mixture to thereby free the water from the hydrocarbons, then heating the whole admixture and vaporizing the alcohol and the lighter hydrocarbon constituents, and condensing and separating the alcohol from the hydrocarbons for further use in the process.

In witness that I claim the foregoing I have hereunto subscribed my name this 10th day of February, 1919.

WALTER ARTHUR BROWN.

Witness:
V. BERINGER.